United States Patent [19]

Honigsbaum

[11] 4,184,531

[45] Jan. 22, 1980

[54] VEHICLE WHEEL ASSEMBLY HAVING SHEARABLE TIRE LATCHING RINGS

[76] Inventor: Richard F. Honigsbaum, 21A Barry Gardens, Passaic, N.J. 07055

[21] Appl. No.: 758,905

[22] Filed: Jan. 12, 1977

[51] Int. Cl.$^2$ .......................................... B60C 15/02
[52] U.S. Cl. ................................ 152/379.1; 152/399; 301/97; 301/97
[58] Field of Search ............... 152/399, 400, 382, 409, 152/410, 381.2, 381.1, 379.2, 362 R, 362 C, 362 S, 378 R, 380, 384, 386, 387, DIG. 6, DIG. 8, DIG. 9, DIG. 17

[56] References Cited

U.S. PATENT DOCUMENTS

| | | | |
|---|---|---|---|
| 2,028,601 | 1/1936 | Hall | 152/400 |
| 2,409,666 | 10/1946 | Comey | 152/379.2 X |
| 2,868,259 | 1/1959 | Powers | 152/381.1 |
| 3,884,286 | 5/1975 | Verdier | 152/378 X |
| 3,916,970 | 11/1975 | Owens | 152/399 X |
| 4,042,003 | 8/1977 | Gaskill et al. | 152/400 X |

FOREIGN PATENT DOCUMENTS 2521907 12/1975 Fed. Rep. of Germany ........... 152/399

Primary Examiner—Joseph F. Peters, Jr.
Assistant Examiner—D. W. Underwood
Attorney, Agent, or Firm—Hubbell, Cohen, Stiefel & Gross

[57] ABSTRACT

Improved assembly for removably securing an inflatable tire about a vehicle wheel includes a latching ring disposed in a circumferential receiving groove in the bead seat of the wheel adjacent the inner face of the tire bead. The latching ring includes a portion protruding above the bead seat for retaining the tire in place and a portion shearable by a force applied to the outwardly facing surface of the tire bead in excess of the force encountered during rotation of the vehicle wheel, whereby the tire may be removed without damage upon shearing of the shearable portion.

28 Claims, 4 Drawing Figures

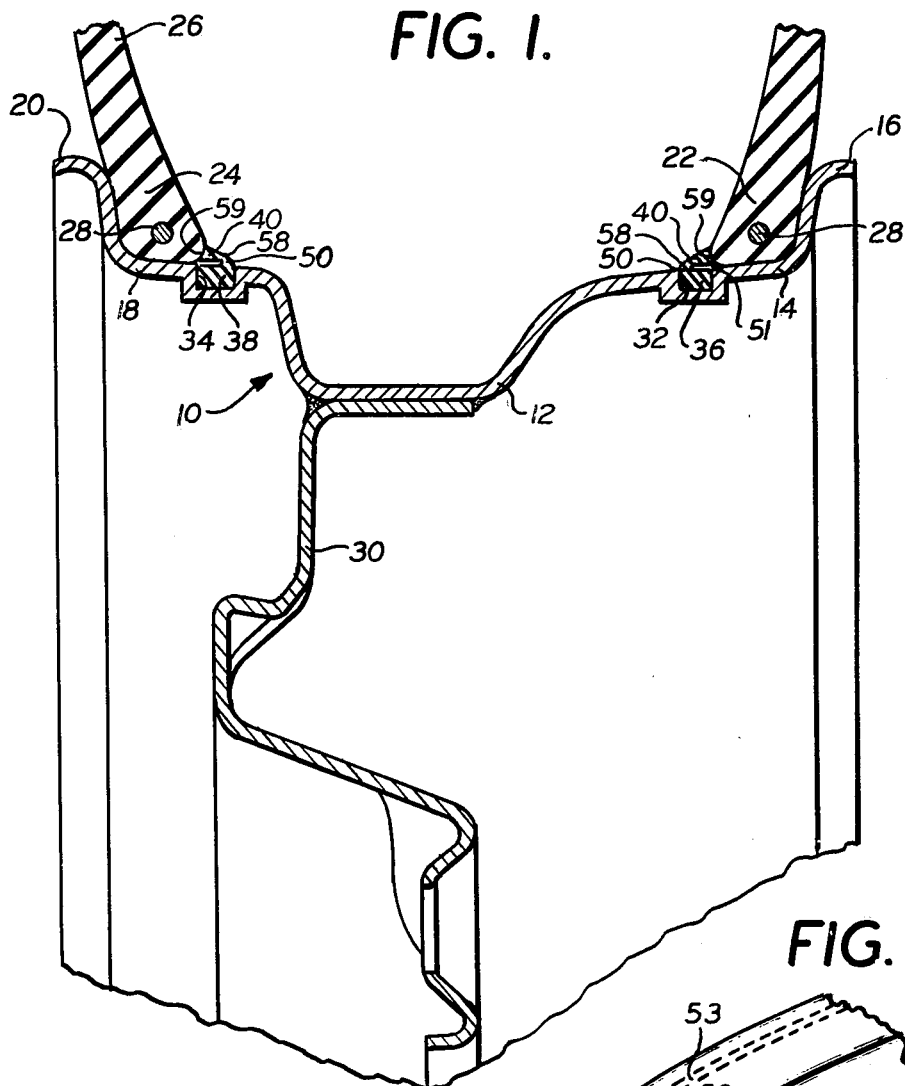
FIG. 1.
FIG. 2.
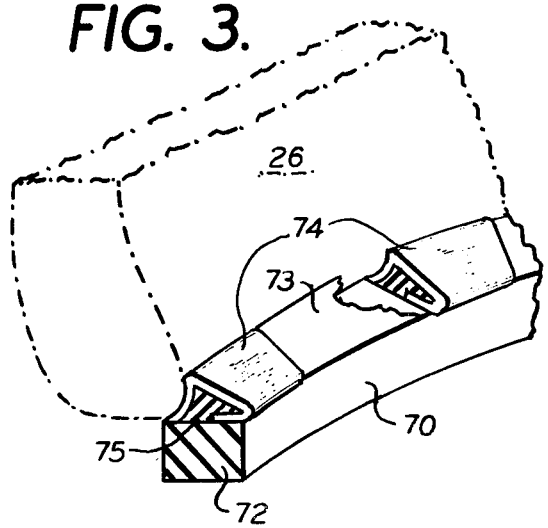
FIG. 3.
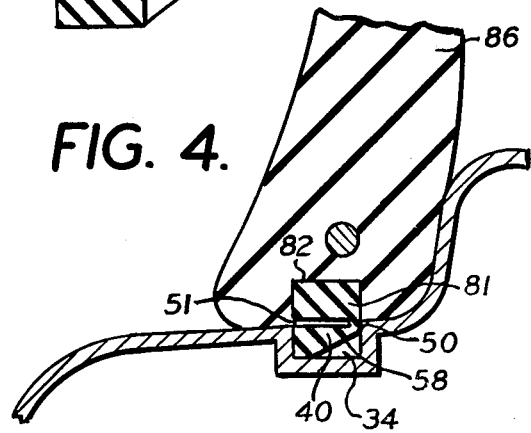
FIG. 4.

VEHICLE WHEEL ASSEMBLY HAVING SHEARABLE TIRE LATCHING RINGS

BACKGROUND OF THE INVENTION

1. Field of the Invention

The present invention relates to wheel assemblies and more particularly to a wheel assembly adapted for securing a deflated tire to the rim.

2. Prior Art

In most conventional wheel assemblies the inflated tire is secured in place by humps in the rim adjacent the inner surfaces of the tire beads, which, together with the air pressure, serve to hold the outer surfaces of the tire beads adjacent the rim flanges. Once a tire becomes deflated, however, severe sidewall deflection, such as occurs when a deflated tire is rolled against a surface as the vehicle is propelled, often forces the tire beads over the humps, thereby unseating the tire from the wheel and forcing the vehicle to be brought to a halt almost immediately after deflation of the tire occurs. Thus conventional wheel assemblies are incapable of securing a deflated tire on the rim over distances which normally must be traveled to get off a dangerous highway or out of a high crime area to a location where the tire may be safely changed. This inability to travel extended distances with a deflated tire also necessitates carrying a spare tire and the tools used to exchange the tire with the spare.

Various prior art attempts to resolve this problem have been offered. For example, U.S. Pat. No. 3,865,170 issued to Mitchell discloses a wheel assembly comprising a sealing ring disposed between a disc portion and a second rim part, these parts being held together by a nut and bolt assembly. The parts are so dimensioned that the ring protrudes above the bead seat of the rim adjacent the inner portion of the tire bead with the protrusion being of sufficient height to prevent the tire from becoming displaced even when the tire is deflated. Such an arrangement is not satisfactory however since it is expensive and leak prone, and requires that the wheel be disassembled and assembled each time the tire has to be changed. A similar arrangement with similar disadvantages is disclosed in U.S. Pat. No. 2,405,954 issued to Hollerith.

Another unsatisfactory prior art attempt at solving this problem is disclosed in U.S. Pat. No. 2,198,978 issued to Sauer, wherein either a ridge or a ring is disposed on the bead seat of the rim which serves the same purpose as the aforementioned sealing ring disclosed in U.S. Pat. No. 3,865,170. This arrangement is very similar to that employed on conventional wheel assemblies and does not satisfactorily secure a deflated tire on the rim.

Still another unsatisfactory prior art attempt at solving this problem is disclosed in U.S. Pat. No. 3,708,847 which discloses a wheel assembly in which the conventional well portion is replaced by a well portion disposed adjacent one of the rim flanges. In this arrangement, after the tire is mounted on the wheel, the wheel is disposed between a pair of guides which engage the sides of the well portion. These guides are moved together until the radially outer portions of the sides of the well are moved into contact with one another in such a way that the wheel then has a substantially continuous bead seat. A circumferentially extending hump may be formed in this bead seat to hold the tire beads more securely against axial forces, and, if desired, a hollow tube may be disposed in the well portion prior to compression. In such an instance, during compression the tube is forced radially outward so that it projects to form a circumferentially extending ridge adjacent the outboard bead of the tire. This may also be accomplished instead by use of a split metal ring. None of these approaches, however, is satisfactory in that once the well portion is subjected to compression, the profile of the rim is changed, with the result that the wheel cannot be reused. Thus tire replacement involves changing not only the tire, but also the entire wheel assembly as well.

These disadvantages of the prior art are overcome by the present invention.

SUMMARY OF THE INVENTION

The present invention comprises a wheel assembly capable of securing a tire bead on the bead seat adjacent the rim flange even when the tire has become deflated due to puncture or otherwise, and allows removal of the tire from the wheel with conventional dismounting equipment and procedures without damage to the tire beads.

According to the present invention, a conventional wheel having a conventional center member and rim, the rim having a well and a pair of bead seats contiguous with the sidewalls of the well, each bead seat terminating in a rim flange, is provided with preferably two receiving grooves one of which extends circumferentially about the inboard bead seat, the other extending circumferentially about the outboard bead seat. Disposable within each groove is a latching ring having a shear section, the latching rings being so dimensioned that when disposed in the grooves, a portion of the rings protrudes radially outward from the bead seats. The grooves are positioned relative to the rim flanges such that with the tire beads disposed on the bead seats adjacent the rim flanges, the tire beads will be secured between the flanges and the protruding portions of the rings, the protrusions being of sufficient height to secure the tire beads adjacent the rim flanges even when the tire has become deflated.

The shear sections are designed to permit shearing of the protruding portion of the rings upon the application of sufficient inward axial force on the tire beads, thereby permitting dismounting of the tires without damage to the tire beads. The rings, however, will not shear under the influence of such inward axial forces as occur during normal operation of the vehicle wheel, e.g. cornering.

Moreover, the rings are designed to avoid shearing during mounting. This is preferably accomplished by sloping the surfaces of the protrusions adjacent the well downward toward the well, following as example conventional latches, in order to reduce the force necessary to force the tire beads over the protrusions. Moreover, because of this latch arrangement, the rings possess a built in safeguard against improper mounting. Thus, if a ring is mounted with the sloped portion of the protrusion facing outward, it will shear under the force applied to the ring during mounting. In the preferred embodiment a portion of the tire bead will overlap a portion of the latching ring in order to oppose the centrifugal force on the rings occasioned by rotation of the wheel, thus insuring that the rings remain in the grooves during vehicle use.

In the preferred embodiment the shear section is provided by a continuous circumferential groove in the ring, flush with the bead seat and in confronting relation with the rim flange. In an alternative embodiment the latching rings are reinforced, preferably by a plurality of metallic clips disposed at regularly spaced intervals along the rings. These clips serve to preserve the unloaded profile of the ring against distortion due to load.

The wheel assembly of the present invention thus provides an inexpensive apparatus for securing a tire to a wheel, employs conventional tires and bead seats as well as conventional tire mounting and dismounting procedures and tools, and does not compromise the pneumatic integrity of conventional wheel and tire assemblies in any way. It is particularly suited for passenger cars, the tubeless tires of which are often serviced by inexperienced personnel, because the tire beads will not seat unless the rings are both sound and properly installed.

BRIEF DESCRIPTION OF THE DRAWINGS

In the drawings:

FIG. 1 is a view in vertical section showing the preferred wheel assembly of the present invention;

FIG. 2 is a fragmentary perspective view showing the preferred embodiment of the latching ring;

FIG. 3 is a fragmentary perspective view showing an alternative embodiment of the latching ring; and FIG. 4 is a fragmentary view in vertical section showing an alternative embodiment of the wheel assembly of the present invention.

DETAILED DESCRIPTION

Referring now to the drawings in detail and particularly to FIG. 1 thereof, a wheel assembly in accordance with the present invention is shown. The rim contour, generally designated by the reference numeral 10, is substantially that bearing the TIRE AND RIM ASSOCIATION, INC. designation "JJ" excepting the receiving grooves 32, 34 which replace the conventional humps. Immediately recognizable are well portion 12, inboard bead seat 14 terminating in an inner hook shaped rim flange 16, and an outboard bead seat 18 terminating in an outer hook shaped rim flange 20. The inboard and outboard tire beads 22, 24 of a conventional tubeless tire 26 having wire bead reinforcements 28 are shown seated on the bead seats 14, 18 respectively. Also shown is central member 30.

In accordance with the present invention, the rim 10 preferably has an inboard circumferential receiving groove 32 and an outboard circumferential receiving groove 34. Disposed in each of the grooves 32, 34 respectively, are tire latching rings 36, 38 shown in further detail in FIG. 2. As shown and preferred, the rings 36, 38 have a portion 40 which protrudes above the bead seats 14, 18. The protrusions 40 are of sufficient height such that with the rings 36, 38 disposed in the grooves 32, 34 will securely sandwich the tire beads 22, 24 adjacent their respective rim flanges 16, 20 even when the tire 26 has become deflated due to puncture or otherwise. The latching rings 36, 38 are further characterized in that each is provided with a shear section 50. When sufficient inward axial pressure is transmitted via the tire beads 22, 24 to the latching rings 36, 38, such as may be accomplished with conventional tire dismounting apparatus, the rings will shear along the shear section 50 thus permitting removal of the tire 26 from the rim 10 without damaging the tire beads 22, 24. The inward axial force necessary to shear the rings 36, 38 is in excess of that developed under normal vehicle operating conditions, such as cornering. Furthermore, and as will be more fully explained hereinafter, the rings are preferably designed to avoid accidental shearing during the tire mounting procedure.

The latching rings 36, 38 in accordance with the present invention are preferably elastic, and are stretched over the rim flanges 16, 20 for mounting on the rim 10. As presently preferred, the rings are constructed of tire sidewall compound because such material is known to be compatible with conventional tires, rim material, and mounting lubricants, although other suitable stretchable materials well known to the skilled art worker may also be employed. If desired, the rings 36, 38 may be reinforced with inserts or attachments of, for example, metal. Suitable fibers and strands of either the natural or synthetic varieties, such as those presently used for tire belts and cords, may also be employed for this purpose. Of course, inasmuch as the rings 36, 38 are stretched over the flanges 16, 20 for mounting, it is apparent that any reinforcement of the rings 36, 38 must accommodate such mounting.

The provision of a suitable shear section 50 in the rings 36, 38 may be accomplished in a variety of ways, the arrangement shown in FIGS. 1 and 2 being preferred. Thus, circumferentially extending grooves 51 in the rings 36, 38 may be used. As shown, the grooves 51 are preferably a continuation of the bead seats 14, 18 such that when the rings 36, 38 are sheared, the tire beads 22, 24 will readily slide into well 12, thereby facilitating removal of the tire 26 in the conventional manner. As presently preferred and shown, each ring has a single continuous groove 51 resulting in shear section 50. This shear section can alternately be introduced in other ways. Grooving alternatives include a second groove at the other end of the shear line and a plurality of grooves preferably at regularly spaced intervals. Bonding alternatives include ring assemblies in which the shear section is a controlled strength bond. Combination alternatives include rings in which groove faces are joined by a controlled strength bond.

The wheel, tire, and latching rings are preferably lubricated as part of the preparation for assembly, and then assembled according to the following procedure. The tire 26 is first placed on the rim 10 in the conventional manner with the beads 22, 24 disposed in the well portion 12. Before inflating the tire 26, the latching rings 36, 38 are seated in their previously cleared respective receiving grooves 32, 34. Beads are then started on their seats in the conventional way, with air being supplied in order to pressurize the tire. As pressures rise, beads 22, 24 slide over the rings, this sliding being facilitated by the previously mentioned lubricant and by ring faces 58, the profiles of which, following the examples of conventional latches, are angled or otherwise contoured so that rings are partially compressed into their receiving grooves during the bead seating process, but return to their expected positions when beads are home. In the case of tubeless tires, the rings also complete the pneumatic seal which would otherwise be broken when beads cross receiving grooves 32 and 34. Thus beads will not seat unless rings are both sound and properly installed.

Skilled art workers will immediately recognize that tire removal procedures are conventional, the rings being sheared by the forces applied to unseat the beads.

During travel of the tire 26 over a surface at relatively high speeds, the centrifugal force produced will tend to unseat the rings 36, 38 from the grooves 32, 34. In order to overcome this difficulty, the portion of the bead seats 14, 18 between the grooves 32, 34 and the flanges 16, 20 are preferably narrower than the width of the tire beads 22, 24. Thus, as shown in FIG. 1, when the tire beads 22, 24 are in position on the bead seats 14, 18 the portion of the tire beads adjacent the well will overlie the latching rings 36, 38 and oppose the lifting force. As presently preferred and shown in FIG. 2, the protrusions 40 of the rings 36, 38 are indented at 44 to accommodate the overlying portions of the tire beads.

Referring to FIG. 1, the respective faces 59 of rings 36, 38 confronting beads 22, 24 are shown substantially normal to the bead seats 14, 18 because beads cannot unseat by climbing rings as long as this angular relationship exists. Skilled art workers will immediately recognize, however, that this angular relationship will not prevail when demounting forces of sufficient magnitude are applied, because both rings and tires are made of elastic materials which deform under load.

While some potential for climbing rings results from this deformation, it is clear that this invention is superior for its intended purpose not only when deformed rings protrude further from the bead seats then the conventional humps, but also when the protrusion is the same, because the elastic deformation at the ring-bead interface results in a strong and effective restoring force which acts to reseat the beads, while the restoring force at the hump-bead interface of conventional wheel assemblies is weak because of hump profiles, and rendered ineffective by the high coefficients of friction between these members. Ring stiffness, which has an important influence on both restoring force and protrusion under load, can be adjusted at the design stage by adjusting ring section, reinforcement, and material. The clip reinforced embodiment of FIG. 3 is an example of such adjustment.

An alternate approach to the problem of ring climbing is that of bonding the rings to the tires as part of the wheel assembly procedure. One way of doing this is to coat either or both of the mating surfaces with adhesive. Another is that of using a slow setting adhesive as the mounting lubricant. Removal of attached ring residue from beads of tires intended for reuse is preferably effected on the basis of a controlled strength bond.

Since the preferred embodiment shown in FIG. 1 accommodates standard tires on rims which can be made on standard equipment, and in which standard equipment may be used for mounting and dismounting the tires on the rims, the only additional costs incurred by the vehicle manufacturer or tire service facility are the ones of purchasing and mounting the expendable rings 36, 38.

Referring now to FIG. 3, a clip reinforced latching ring 70 is shown. Illustrated in the drawing are clips 74, upper elastic portion 73, lower elastic portion 72, and bond 75. The clips 74 are preferably made of metal, shaped to match the unloaded contour of upper portion 73, and uniformly spaced along and bonded to that portion. Controlled strength bond 75 which joins the clip reinforced upper portion 73 to the lower portion 72 serves as the shear section. Other embodiments include those which result when reinforcing clips are added to other embodiments of FIG. 2. Still another embodiment is that which results when all or part of the upper elastic portion 73 is omitted, the shear section resulting from a controlled strength bond between the clips 74 and the lower elastic portion 72. This last embodiment is intended for tires requiring tubes. Details of installation and operation of these embodiments follow those described earlier excepting the pneumatic seal of this last embodiment which is, of course, provided by the tube.

The embodiment of FIG. 4 is an assembly similar to that of FIG. 1 except that ring 81 is retained in groove 82 in special tire 86 made or modified for the purpose, and latches into receiving groove 34 for purposes explained earlier. Since these rings latch to the rims rather than the tires, ring portions radially inward and outward with respect to bead seats are reversed with respect to those of FIG. 1. On this basis faces 58 and 59 are readily identified, as are protruding portion 40 and shear section 50. Shear section 50 can be introduced in any of the ways described earlier, but for reasons which will become apparent, the bonded arrangement is preferred. Since groove 82 limits the radial excursion of the ring 81 due to centrifugal force, indentations 44 are omitted. The rings are held in place in their respective tire grooves by bonds which are preferably made stronger than shear section bonds so that tires removed from rims in the conventional way will resemble conventional tires, the projecting portion 40 having been sheared off. Any part of 40 which remains can be peeled off on the basis of the difference in strengths between these bonds. Obviously, alternate arrangements which produce the same result will also serve. Since replacement of the rings in the tire grooves is a task not conveniently performed at most tire service facilities, tires there are prepared for remounting by removing the remaining portions of the rings on the basis that the bond which holds the ring 81 in groove 82 is weaker than tire or ring material. The tire may then be remounted using ring embodiments of FIG. 2 or 3 and the procedures associated therewith.

The major attraction of this embodiment is, of course, the labor saved in tire mounting when rings are attached to tires. While tires in accordance with this embodiment are special, they are easily made to appear conventional by peeling off the protruding part 40 of the rings as explained earlier, and as such can be mounted on conventional rims as well as those of FIG. 1.

Thus the embodiments of FIGS. 1, 2, 3, and 4 have been described. Since these descriptions have been qualitative, numerical calculations are now introduced to confirm the basis of this invention, i.e. that rings weak enough to shear without damaging tires are strong enough to hold these tires in place during operational use. Because numerical values are a function of the application, a four wheeled vehicle fitted with the popular GR 78/15 tire is used as example. Pertinent data extracted from the 1976 HANDBOOK of the TIRE AND RIM ASSOCIATION, INC., follows.

| | |
|---|---|
| Overwall Diameter (New Highway Tires) | 27.52 in. |
| Maximum Cold Inflation (load range B) | 32 psi |
| Maximum Car Tire Load (per tire) | 1620 lb. |
| Rim Diameter (Nominal) | 15 in. |
| Seat Angle | 5 degrees |

Thus a new tire with a carcass plus tread thickness of no more than ⅜ in. applies a gross axial force to the rim of at least $$(25.77^2 - 15^2) \cdot \frac{\pi}{4} \cdot 32 \approx 11,000 \text{ lb.}$$

equivalent to a unit force of $$\frac{11,000}{15 \cdot \pi} \approx 233 \text{ lb/in}$$

(less, of course, any portion of the gross or unit force absorbed by the tire itself) at the bead at maximum cold inflation. Recognizing that tires in service are subject to both thermal and dynamic loading, both of which will raise these values, it is clear that a ring shearing force of at least this value can safely be transmitted to the ring via the tire. Further, rings which shear at this value are fully capable of resisting any maneuvers which can be resisted by a fully inflated tire in the absence of such rings. While there is more than enough room to accommodate such rings in the space presently occupied by the humps of conventional wheels, persons skilled in the art will recognize that such high shear values are an unwarranted luxury because the high slip angles needed to develop large cornering forces at low inflation are seldom realized unless both tires on a given axle are severely underinflated, and even in this unusual case, rings which shear at half the previously calculated value are probably more than adequate.

In the usual case where one tire of an axle pair is flat, cornering forces on this flat can be ignored for reasons mentioned earlier. Braking and acceleration forces must, however be considered, and particularly the former, because some drivers will panic and lock brakes in response to a blowout. Retarding forces under such conditions can be as high as 1620 lbs per wheel or $$\frac{1620}{2 \cdot 15 \cdot \pi} \approx 17.2 \text{ lb/in}$$

assuming both beads to be fully effective. On the basis of the five degree seat angle, and a coefficient of friction between bead and rim of unity, (higher values are not uncommon because tires bond to rims in service) only the modest axial force of $$\frac{17.2}{1 \cdot \cot 5°} \approx 1.5 \text{ lb/in}$$

is needed to keep the tire from turning with respect to the wheel. Thus a ring-applied axial bead force of 5 to 10 lb/in provides an adequate margin of safety except perhaps when tires are subjected to such abuse immediately after mounting.

This axial force is applied by a suitably profiled ring face 59, augmented where necessary by a ring embodiment a portion of which, shown dotted and labeled 53 in FIG. 2, is made of closed cell foam or similar material. The cells of this foam are pressurized by diffusion to the level of the inflated tire in service and expand to provide the necessary force when the tire deflates. This pressurized cell option is not included in the preferred embodiment because the forces which tend to rotate the tire with respect to the rim are resisted by the bond which forms between the tire and rim in service, the ring merely serving to resist the unseating forces resulting from flexing and mentioned earlier.

The wheel assembly in accordance with the present invention also permits tubeless tires to be employed in applications formerly restricted to tube type tires. Thus, for example, off-road motorcycles are intentionally operated with tires partially deflated to provide "floatation". The wheel assembly of the present invention would permit tubeless tires to be used in this situation since, as described above, the preferred arrangement insures that the tire beads remain secured on the bead seats when the tire has been deflated.

The present invention may also be advantageously employed on vehicles equipped with more than two wheels per axle, such as busses and trucks. On such vehicles, a flat tire on one of the two wheels on either side of the axle is imperceptible to the driver. This creates a hazardous condition in that the friction developed due to slippage between the rim and the tire often heats the tire to the point where it will burst into flames. This source of friction and the heat occasioned thereby may be reduced by employing the present invention which insures that slippage of the tire beads on the rim is avoided or substantially reduced even when the tire has become deflated.

The design of the latching rings 36, 38 inherently prevents improper mounting of the rings in the grooves. Thus, if a ring is mounted backwards in the groove it will be sheared during mounting thereby avoiding a potentially hazardous condition.

While the wheel assembly of the present invention has emphasized the tubeless tire 26, it will be readily apparent to the skilled art worker that tube type tires may also be employed. Furthermore, while two tire latching rings are preferred and shown, the wheel assembly may also be employed with only one ring. If this alternative is employed, the ring is preferably disposed on the outboard bead seat 18.

Further, the latching ring of the present invention may be employed on rims having contours other than the rim contour 10 shown and described above. For example, the rim contours of conventional three-piece wheel assemblies, which accommodate tube type tires and are extensively used on large trucks such as semi-trailers, do not include a well. However, their bead seats may be grooved to accommodate tire latching rings according to the present invention.

As used throughout the specification and claims the term "axial force" refers to a force substantially in the direction of the axis of rotation of the wheel assembly, and the term "inward axial force" refers to an axial force directed toward the well of the wheel assembly. The term "operational use" as applied to the vehicle wheel assembly refers to the conventional operation of the vehicle by rotation of the wheel assembly against a surface.

While I have herein shown and described the preferred embodiments of the present invention and have suggested modifications therein, other modifications and changes may be made within the scope of the appended claims without departing from the spirit and scope of this invention.

What is claimed is:

1. In an improved assembly for removably securing an inflatable tire about a vehicle wheel for enabling rotational movement of the mounted tire against a surface for propelling the vehicle, said tire including a tire bead having an outwardly facing surface, the assembly being of the type including a wheel, said wheel including a rim and center member, the rim having a well, an inboard bead seat contiguous with the inboard sidewall of said well, and an outboard bead seat contiguous with the outboard sidewall of said well, said inboard bead seat terminating in an inboard rim flange, said outboard bead seat terminating in an outboard rim flange; the improvement in said assembly comprising: at least one of said bead seats having at least one circumferential receiving groove therein; and at least one latching ring, said ring including a portion disposable in said groove and a portion which protrudes radially outward from said grooved bead seat when said ring is disposed in said groove, the protruding portion being dimensioned to secure the tire bead adjacent its terminating rim flange when said tire bead is seated on said grooved bead seat, said protruding portion protruding sufficiently from said groove to secure said tire bead adjacent said last-mentioned rim flange even if said tire should become deflated, said ring having a portion axially shearable along a shear section by an inward axial force applied to the outwardly facing surface of said tire bead substantially in the direction of the axis of rotation of the mounted tire, said inward axial force being in excess of the axial force applied to the ring by said tire bead as a result of the rotational movement of said tire against said surface, whereby after said shearable portion has been sheared off by applying a sufficient inward axial force to said latching ring shearable portion, said tire may be dismounted from the wheel without damaging said tire bead, said at least one ring including means for avoiding shearing of said shearable portion during mounting of said tire on said rim.

2. The vehicle wheel assembly of claim 1 wherein said at least one bead seat is said outboard bead seat.

3. The vehicle wheel assembly of claim 1 wherein said shear section comprises a cylindrical surface substantially flush with said at least one grooved bead seat whereby said protruding portion of said ring will be sheared upon the application of said inward axial shearing force.

4. The vehicle wheel assembly of claim 1 wherein said at least one latching ring is comprised of an elastic material.

5. The vehicle wheel assembly of claim 1 wherein said protruding portion comprises a continuous circumferential protrusion.

6. The vehicle wheel assembly of claim 1 wherein said protruding portion comprises a plurality of spaced apart protrusions.

7. The vehicle wheel assembly of claim 1 further comprising at least one other receiving groove and at least one other latching ring disposable in said at least one other groove.

8. The vehicle wheel assembly of claim 7 wherein said at least one other groove is in the other of said bead seats.

9. The vehicle wheel assembly of claim 1 wherein said shear section is provided by at least one circumferential groove in said at least one latching ring.

10. The vehicle wheel assembly of claim 1 wherein said shear section is provided by a controlled strength bond at the interface of said shearable portion of said ring and the remainder of said ring.

11. The vehicle wheel assembly of claim 1 wherein said shear section comprises a controlled strength bond at the interface of said shearable portion of said ring and the remainder of said ring.

12. The vehicle wheel assembly of claim 1 wherein said ring is dimensioned to pneumatically seal said at least one receiving groove during mounting whereby said vehicle wheel assembly may be employed with tubeless tires.

13. The vehicle wheel assembly of claim 1 wherein said protruding portion is adjacent said tire bead when said tire is mounted on said rim and said ring is disposed in said groove.

14. The vehicle wheel assembly of claim 13 wherein the face of said protruding portion confronting said tire bead is substantially perpendicular to said at least one bead seat.

15. The vehicle wheel assembly of claim 14 wherein said at least one latching ring is comprised of an elastic material whereby any deformation at the interface of said latching ring and said tire bead as a result of rotational movement of said tire against said surface results in a restoring force which acts to reseat said tire bead.

16. The vehicle wheel assembly of claim 13 wherein said protruding portion comprises a plurality of clips.

17. The vehicle wheel assembly of claim 13 wherein the face of said protruding portion confronting said tire bead is suitably profiled to provide a sufficient axial force to said tire bead to prevent rotation of said tire relative to said wheel during rotational movement of said tire against said surface.

18. The vehicle wheel assembly of claim 17 wherein said protruding portion includes a pressurized cell portion the cells of which are pressurized substantially to the level of the inflated tire whereby should the tire deflate, the cells will expand to augment said rotation preventive axial force.

19. The vehicle wheel assembly of claim 13 wherein a portion of said tire bead overlaps a portion of said at least one groove and wherein said protruding portion of said at least one latching ring has an axially outward facing circumferential indentation for accommodating said overlapping portion of said tire beads whereby the centrifugal force occasioned by rotation of said tire against said surface, which tends to unseat said ring from said groove, will be opposed by said overlapping portion.

20. The vehicle wheel assembly of claim 1 wherein said protruding portion comprises an elastic portion reinforced by a plurality of clips affixed thereto.

21. The vehicle wheel assembly of claim 1 wherein said means for avoiding shearing of said ring during mounting of said tire on said wheel comprises said protrusion being profiled in the manner of a latch whereby to permit sliding of said tire bead over said protruding portion during mounting.

22. The vehicle wheel assembly of claim 1 wherein the protruding portion of said at least one latching ring is receivable in a circumferential groove in said tire bead when said tire bead is seated on said at least one grooved bead seat.

23. In an improved vehicle wheel and tire assembly for removably securing an inflatable tire about a vehicle wheel for enabling rotational movement of the mounted tire against the surface for propelling the vehicle, said wheel and tire assembly being of the type including a wheel, said wheel including a rim and center member, the rim having a well, an inboard bead seat contiguous with the inboard sidewall of said well, an outboard bead seat contiguous with the outboard sidewall of said well, said inboard bead seat terminating in an inboard rim flange and said outboard bead seat terminating in an outboard rim flange; and a tire, said tire being of the type having an inboard bead seatable on said inboard bead seat and an outboard bead seatable on said outboard bead seat; the improvement in said wheel and tire assembly comprising: at least one of said bead seats having a circumferential receiving groove therein; the radially inward face of at least the tire bead seatable on said at least one grooved bead seat having a circumferential receiving groove therein; and at least one latching ring having a portion disposable in said tire bead groove, and a portion which protrudes radially inward from said tire bead when said ring is disposed in said tire bead groove, said protruding portion being receivable in said at least one grooved bead seat to secure said at least one tire bead on said grooved bead seat adjacent its terminating rim flange even if said tire should become deflated, said ring having a portion axially shearable along a shear section, said shearable portion only being shearable by an inward axial force substantially in the direction of the axis of rotation of the mounted tire and in excess of the axial force applied to the ring by said grooved tire bead as a result of the rotational movement of said tire against said surface whereby after said shearable portion has been sheared off by applying a sufficient inward axial force to said latching ring shearable portion, said tire may be dismounted from the wheel without damaging said grooved tire bead, said at least one latching ring including means for avoiding shearing of said shearable portion during mounting of said tire on said rim.

24. The vehicle wheel assembly of claim 23 wherein said portion of said latching ring disposable in said tire bead groove is secured in said groove by a controlled strength bond, said controlled strength bond being sufficiently strong to withstand said inward axial shearing force.

25. The vehicle wheel assembly of claim 24 wherein said means for avoiding shearing of said shearable portion during mounting of said tire on said rim comprises said protruding portion being profiled in the manner of a latch.

26. The vehicle wheel assembly of claim 23 wherein said shearable portion is said protruding portion.

27. A latching ring for removably securing an inflatable tire about a vehicle wheel for enabling rotational movement of the mounted tire against a surface for propelling the vehicle, said tire including a tire bead having an outwardly facing surface, said wheel being of the type including a rim having an inboard bead seat and an outboard bead seat, at least one of said bead seats having at least one circumferential receiving groove therein, said inboard bead seat terminating in an inboard rim flange, said outboard bead seat terminating in an outboard rim flange; said latching ring comprising: a portion disposable in said groove and a portion which protrudes radially outward from said grooved bead seat when said ring is disposed in said groove, the protruding portion being dimensioned to secure the tire bead adjacent its terminating ring flange when said tire bead is seated on said grooved bead seat, said protruding portion protruding sufficiently from said groove to secure said tire bead adjacent said last-mentioned rim flange even if said tire should become deflated, said ring having a portion axially shearable along a shear section, the shearable portion only being shearable by an inward axial force applied to the outwardly facing surface of said tire bead substantially in the direction of the axis of rotation of the mounted tire, said inward axial force being in excess of the axial force applied to the ring by said tire bead as a result of rotational movement of said tire against said surface, whereby after said shearable portion has been sheared off by application of a sufficient inward axial force, said tire may be dismounted from the wheel without damaging said tire bead, said at least one ring including means for avoiding shearing of said shearable portion during mounting of said tire on said rim.

28. In an improved vehicle tire adapted for removable securement to a vehicle wheel assembly, said wheel assembly including a center member, a rim, and a latching ring, the rim having a well, an inboard bead seat contiguous with the inboard sidewall of said well, an outboard bead seat contiguous with the outboard sidewall of said well, at least one of said bead seats having a circumferential receiving groove therein, said inboard bead seat terminating in an inboard rim flange and said outboard bead seat terminating in an outboard rim flange, said latching ring including a portion disposable in said groove and a portion which protrudes radially outward from said grooved bead seat when said ring is disposed in said groove; said tire being of the type including an inboard tire bead seatable on said inboard bead seat and an outboard tire bead seatable on said outboard bead seat, the improvement in said tire comprising: the radially inward face of the tire bead seatable on said at least one grooved bead seat having a circumferential groove therein for receiving said protruding portion of said latching ring whereby to secure said tire on said grooved bead seat adjacent its terminating rim flange even if said tire should become deflated.

* * * * *